Dec. 14, 1965 J. A. COOK, JR 3,223,936
TRANSISTOR LIMITER AMPLIFIER CIRCUIT
Filed Oct. 23, 1962
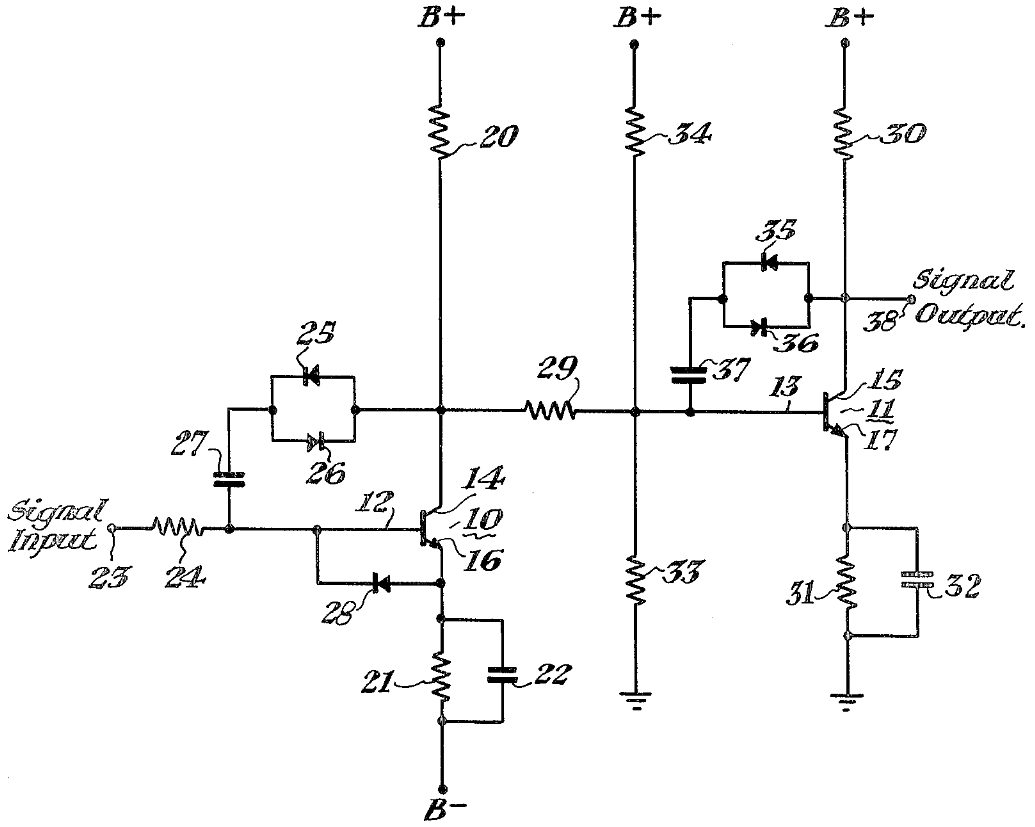
INVENTOR.
James A. Cook Jr.
BY W. L. Stout
HIS ATTORNEY United States Patent Office 3,223,936
Patented Dec. 14, 1965

3,223,936
TRANSISTOR LIMITER AMPLIFIER CIRCUIT
James A. Cook, Jr., Wilkinsburg, Pa., assignor to Westinghouse Air Brake Company, Wilmerding, Pa., a corporation of Pennsylvania
Filed Oct. 23, 1962, Ser. No. 232,491
4 Claims. (Cl. 330—19)

My invention in general relates to transistor circuits, and more particularly to a transistor amplifying limiting circuit for providing an automatic level control.

In the design of frequency shift speed measuring apparatus, it has been found difficult to utilize and accommodate the usual amplifier arrangement because of output signal elimination occurring therein. For example, in a conventional Doppler speed measuring apparatus, a high freqeuncy signal is generated and propagated in a highly directional pattern toward a moving object. The signal, in turn, is reflected from the surface of the moving object with a shift in frequency that is proportional to the object speed. Upon reception, the reflected signal is then mixed with a portion of the originally generated signal so that a difference frequency or beat frequency signal whose frequency equals the shift in frequency of the reflected signal is then produced by proper rectifying and filtering circuits. This difference frequency or beat frequency signal is then applied to an amplifier arrangement for producing an amplified output signal which is passed along to an appropriate speed measuring means, for example, a velocity meter panel wherein negative output voltages proportional to the speed of the moving object are produced.

However, for various reasons, for example, the strength of the signal impinging upon the object surfaces and the irregularities in the radiation pattern of the propagated signal, a large range of variation occurs in the amplitude of the reflected signal so that the associated amplifier arrangement must, therefore, be so organized that it can accommodate this large range. For instance, a moving object may be traveling at one moment through a region producing a signal of a very large amplitude and then instantly moves to an adjoining region where the signal is very much smaller in amplitude. Under such a condition, the tendency is for the large amplitude reflected signal to block the usual amplifier so that the immediately following weak amplitude signals are not effective and no output signals are produced by the amplifier. Clearly, such an output is undesirable and intolerable since it leads to inaccuracy in the determination of the speed of the moving object.

Accordingly, it is an object of my invention to provide an improved transistor amplifier circuit.

A still further object is to provide an improved semiconductive amplifier and feedback arrangement.

Another object is to provide an improved amplified arrangement for producing an output signal in response to all input signals irrespective of the large range and sudden variations in the amplitude of the input signals.

Still another object is to provide an improved transistor amplifier arrangement capable of accommodating and amplifying input signals of a varying frequency as well as a widely varying amplitude without any signal elimination occurring therein.

The above objectives are achieved in accordance with the invention by providing a transistor amplifier circuit comprising a series of directly coupled, direct current, common-emitter stages having an automatic amplitude level control. The amplifier includes a unique degenerative feedback circuit between the collector and base electrodes of each stage to overcome the detrimental blocking or eliminating effect heretofore present in usual amplifer circuits. Input signals are applied to the base electrode of the first transistor stage in the series, and output signals are taken from the collector electrode of the last transistor stage in the well-known manner. The feedback circuits are arranged such that very little or a minimum feedback occurs during small signal inputs thus providing maximum stage gain, whereas maximum feedback occurs during periods when the input signals exceed a predetermined level, thereby limiting the stage gain. As is readily apparent, the total gain required determines the number of stages built into a given amplifier, but for the purpose of convenience, I have merely illustrated two stages.

In utilizing direct current transistor stages that are directly coupled I have attained several distinct advantages. First, the amplifier circuit has a short time constant since the reactive elements, e.g., capacitors, inductors and transformers which present energy storage problems have been entirely eliminated from the coupling circuit. Secondly, the amplifier is insensitive to changes in the D.-C. operating point and will function properly regardless of the operating point as long as some collector voltage swing is still available at the output. Further, the amplifier will function normally even though the direct current input level or the collector voltage changes due to variations in the source signal or miscellaneous effects, e.g., such as temperature, supply voltages and component tolerances.

Other objects and advantages of my invention will become apparent from a consideration of the following detailed description, taken in connection with the accompanying figure, which is a schematic diagram of the transistor amplifier in accordance with my invention.

Referring to the single figure of the drawing, the circuit shown comprises a pair of common-emitter semiconductive transistor stages in cascade with each transistor being of the P-type or N-P-N variety. Although P-type or N-P-N transistors have been illustrated, it is to be understood that transistors of opposite conductivity, that is, N-type or P-N-P transistors, may be used in the circuit with a reversal of energizing potentials, as is well known. The first transistor 10 includes a base 12, a collector 14 and an emitter 16 while the second transistor 11 includes a base 13, a collector 15 and an emitter 17. The collector electrode 14 of transistor 10 is connected to a suitable source of positive potential, labeled B+, through a collector load resistor 20. The emitter electrode 16 of transistor 10 is connected to a suitable source of negative potential, labeled B—, through the resistor 21. Resistor 21 is bypassed for signal frequencies by a bypass capacitor 22. The input signals to be amplified are applied from terminal 23 to the base electrode 12 of transistor 10 through a current limiting resistor 24. A degenerative feedback path comprising reversely parallel connected diodes 25 and 26 in series with capacitor 27 is provided for the first transistor stage 10. This negative feedback path is connected from the collector electrode 14 to the base electrode 12 of transistor 10. A diode 28, the operation of which will be described hereinafter is connected between the emitter electrode 16 and the base electrode 12 of transistor 10.

The output signals from first transistor stage 10 are derived from the collector electrode 14 and directly coupled to the base electrode 13 of the second transistor stage 11 through the current limiting resistor 29. The collector electrode 15 of transistor 11 is connected to a suitable source of positive potential, labeled B+, through the collector load resistor 30. The emitter electrode 17 of transistor 11 is connected to ground through resistor 31 and a parallel capacitor 32. The base electrode 13 of transistor 11 is connected to ground through a resistor 33, and to the positive potential B+ through a resistor 34. A degenerative feedback path comprising reversely parallel connected diodes 35 and 36 in series with capacitor 37 is provided for the second transistor stage 11. This negative feedback path is connected between the collector electrode 15 and base electrode 13 of transistor 11. Connector electrode 15 is connected to an output terminal 38, which serves as the main output for the two-stage amplifier limiter circuit.

Proceeding now with a detailed description of the operation of the transistor amplifier limiter according to the present understanding of the invention, initially it is assumed that no heat frequency signal is being applied to the terminal 23. With proper biasing and operating potentials applied to each common-emitter amplifier stage it is readily apparent that the base line level above ground at collector electrodes 14 and 15 is dependent upon the working potentials applied to the amplifier circuit. That is, when the amplifier-limiter is initially connected to power, the diodes 25 and 35 are forwardly biased in excess of their breakdown voltage point so that a charging path is provided therethrough for capacitors 27 and 37, respectively. The capacitors will charge up to a voltage within a few tenths of a volt of the collector to base voltage of its related transistor stage, thereby determining the base line or average value level. As will be described hereinafter, these capacitors couple the feedback signal to the base electrode of their appropriate transistor stages, but their most important function is to permit operation over a wide range of collector to base voltages. In this sense these capacitors act as batteries having short time constants which are continuously and automatically adjustable for variations in the collector to base voltages due to causes hereinbefore enumerated.

As previously set forth, signal elimination arises due to the large variations of amplitude of the input signals, and particularly in instances where small amplitude signals are preceded by large amplitude signals. Therefore, it is necessary to overcome such a difficulty, and it has been found that by limiting the amplitude of the large signals no elimination of the subsequently following weak signals occurs. By providing a unique negative feedback arrangement for each stage of the amplifier circuit an amplitude clipping or limiting action results which confines the amplitude of the large signals to a level that does not produce a blocking effect on the weak signals. The circuit operates by varying the degenerative feedback from the collector to base as a function of the signal level. When the signal at the base is small enough to produce a signal at the collector less than 0.3 v. R.M.S., the diodes represent a high resistance and minimum feedback occurs between the collector and base electrodes, thus providing maximum gain. As the signal level increases the forward breakdown voltage point of the diodes is exceeded, and the diodes exhibit a low resistance so that maximum feedback occurs. As is readily apparent, the amplitude limiting of the signal peaks is determined by the forward breakdown voltage point of the diodes, and by choosing suitably matched diodes the resultant limiting will be substantially identical on both the negative and positive half cycles of the signal with respect to the base line or average value level.

With a beat frequency signal, varying in a sinusoidal manner, applied to the input terminal 23 of the first transistor stage 10, a corresponding amplified signal is produced at the output of the first stage 10. It is noted that the phase relation of the input signal is reversed 180° going through the common-emitter stage 10, and the output signal amplitude is dependent upon the gain factor of transistor 10. Considering an instant of time when the input signal voltage goes positive and aids the forward bias on the base-emitter circuit; the resultant forward voltage at this instant is increased so that the total current flowing through the emitter 16 is increased. Similarly, the amount of current flowing in the base and collector is correspondingly increased. The increased current flowing through collector load resistor 20 causes the lower part of the load resistor 20, as viewed in the drawing, to become more negative with respect to the upper part. This effect continues for the entire half cycle so that as the input signal goes positive and aids the forward bias, the output signal goes negative. On the negative half cycle of the input signal of the voltage opposes the forward bias so that the current flowing through the collector load resistor 20 is decreased, thereby causing the lower part of resistor 20 to become less negative with respect to the upper part. This effect continues for the entire half cycle so that as the input signal goes negative and opposes the forward bias, the output signal goes positive.

As previously mentioned, the output signal of the first stage is directly coupled to the second stage through a current limiting resistor 29. As is readily apparent, a similar operation takes place within the second common-emitter transistor stage 11 as within the first stage 10 with the exception the output signal of stage 11 is positive at the first instant of time since the input thereto initially is a negative signal.

During small amplitude input signals, the peak values of the voltage appearing at the output of stage 10 are insufficient to cause diodes 25 and 26 to conduct so that no feedback occurs between the collector and base electrodes 14 and 12, respectively, and no clipping of the output signal is present. However, depending upon amplitude of the output signal of stage 10, feedback and clipping may or may not take place within transistor stage 11. That is, when the amplified output signal at collector 14, which is the input signal to stage 11, is relatively small so that the peak values produced at collector 15 are insufficient to cause diodes 35 and 36 to break down, no feedback or clipping occurs therein. However, in some instances, the output signals at collector 15 are amplified sufficiently to produce peak-to-peak signal values which result in the conduction of diodes 35 and 36 so that a negative feedback path exists from collector 15 to base 13, thereby rendering a clipping or limiting action of the output signals at collector 15. Specifically, on positive half cycles as the amplified output signal of stage 11 increases, a point is reached on its upward excursion where the anode of diode 35 is made sufficiently positive with respect to its cathode to cause diode 35 to conduct in the forward direction, thereby providing a feedback path between collector 15 and base 13. This degenerative action continues so long as the difference between the voltage of the output signal and the voltage of capacitor 37 exceeds the breakdown voltage of diode 35. Upon the downward excursion of the positive cycle of the output signal a point is reached where the potential difference between the anode and cathode of diode 35 is insufficient to main diode 35 conducting so that diode 35 is cut off and feedback ceases. As the output signal enters the negative half cycle a similar feedback effect is established between collector 15 and base 13. However, the degenerative feedback path during this portion of the cycle consists of the diode 36 and capacitor 37. During this negative alternation of the output signal, a point is reached on its downward excursion where the cathode of diode 36 is made sufficiently negative with respect to its anode to cause diode 36 to conduct, thereby establishing a feedback path between collector 15 and base 13. As noted above, a degenerative feedback signal in proportion to the output signal level is fed back to transistor 11 so that a clipping or limiting action also takes place during this negative portion of the output signal.

Now, when the amplitude of the input signals to transistor 10 reaches a preselected or predetermined signal level, the amplified peak values of the voltage appearing at collector 14 become sufficient to cause diodes 25 and 26 to conduct on alternate half cycles so that a clipping or limiting action takes effect at this first amplifier stage. As a result, the signal input to the second transistor stage 11, which is the output signal of the first transistor stage 10, is controlled and limited to a predetermined value. As is readily apparent, the clipping action occurring in transistor stage 10 is substantially identical to the feedback operation of transistor stage 11 as discussed above so that a detailed discussion is believed unnecessary at this point. Further, it is noted that the circuit components are chosen such that a clipping or limiting action always occurs in transistor stage 11 when a similar action is present in transistor stage 10. Thus, it is seen that a constant check and restriction of any large variations of the output signal is achieved by the unique clipping or limiting arrangement as set forth above.

Under certain circumstances, the base-emitter circuit of transistor 10 may be subject to excessive reverse bias voltages that can destroy the transistor. To forestall the possible occurrence of this transistor destruction, the junction diode 28 is connected between the base 12 and emitter 16 of transistor 10 to provide protection against any severe reverse biasing condition. When diode 28 conducts, only a very small voltage appears across it and the voltage can be considered negligible. In other words, the diode 28 limits the maximum amplitude of reverse base-to-emitter voltage that can be applied to transistor 10 to the value of forward voltage drop of diode 28.

While my invention has been described with reference to a particular embodiment thereof, it will be understood that various modifications may be made by those skilled in the art without departing from the invention. The appended claims are therefore intended to cover all such modifications within the true spirit and scope of the invention.

Having thus described my invention, what I claim is:

1. A transistor limiter amplifier comprising first and second transistors directly coupled with each having emitter, collector and base electrodes, said first transistor having its emitter electrode connected to the negative terminal of a source of operating potential and having its collector electrode connected to the positive terminal of said source, a voltage divider connected between the positive terminal of said source and ground, said second transistor having its base electrode connected to the junction of said voltage divider, having its emitter electrode connected to ground, and having its collector electrode connected to the positive terminal of said source, a first resistance means connecting input signals to be amplified to the base electrode of said first transistor, a second resistance means coupling the amplified signals from the collector electrode of said first transistor to the base electrode of said second transistor, a terminal means connected to the collector electrode of said second transistor for deriving output signals therefrom, and negative feedback circuit means serially connecting the collector electrode to the base electrode of each of said first and second transistors, said feedback means comprising a pair of reversely parallel connected diodes coupled to each of the collector electrodes and a capacitor means coupled from the reversely connected diodes to each of the base electrodes for initially providing a charging path for said capacitor means and thereafter operating as a signal level control of said amplified and output signals with said capacitor means permitting operation of said amplifier over a wide range of collector to base potentials.

2. A transistor amplifying limiting circuit comprising a first and a second transistor directly coupled with each having an emitter, a collector and a base electrode, said first transistor having its emitter electrode connected to the negative terminal of a source of biasing potential and having its collector electrode connected to the positive terminal of said source, a voltage divider connected between the positive terminal of said source and ground, said second transistor having its base electrode connected to the junction of said voltage divider, having its emitter electrode connected to ground, and having its collector electrode connected to the positive terminal of said source, means for applying a signal source to be amplified to the base electrode of said first transistor, means for deriving amplified signals from the collector electrode of said first transistor, first feedback means interconnecting the collector electrode to the base electrode of said first transistor, said first feedback means comprising a pair of reversely parallel connected diodes coupled to the collector electrode of said first transistor and a capacitor means coupled from said diodes to the base electrode of said first transistor for initially providing a charging path for said capacitor means and thereafter providing that amplified signals above a predetermined value produce a degenerative feedback for limiting said amplified signals, means for applying said amplified signals to the base electrode of said second transistor, means for deriving output signals from the collector electrode of said second transistor, and second feedback means interconnecting the collector electrode to the base electrode of said second transistor, said second feedback means comprising a pair of reversely parallel connected diodes coupled to the collector electrode of said second transistor and a capacitor means coupled from said diodes to the base electrode of said second transistor for initially providing a charging path for said capacitor means and thereafter providing that output signals above a predetermined value produce a degenerative feedback for limiting said output signals with said capacitor means permitting operation of said first and second transistors over a wide range of collector to base potentials.

3. A transistor amplifying limiting circuit comprising a first and a second transistor each having an emitter, a collector and a base electrode, said first transistor having its emitter electrode connected to the negative terminal of a source of biasing potential and having its collector electrode connected to the positive terminal of said source, a voltage divider connected between the positive terminal of said source and ground, said second transistor having its base electrode connected to the junction of said voltage divider, having its emitter electrode connected to ground, and having its collector electrode connected to the positive terminal of said source, first resistance means for supplying a signal source to be amplified to the base electrode of said first transistor, means for deriving amplified signals from the collector electrode of said first transistor, first feedback means comprising a pair of parallel reversely connected diodes coupled to the collector electrode of said first transistor and a capacitor means coupled from said diodes to the base electrode of said first transistor for initially providing a charging path for said capacitor means and thereafter providing that amplified signals above a predetermined valve produce a degenerative feedback for limiting said amplified signals with said capacitor means of said first feedback means permitting operation of said first transistor over a wide range of collector to base potentials, second resistance means for directly coupling and supplying said amplified signals to the base electrode of said second transistor, means for deriving output signals from the collector electrode of said second transistor, and second feedback means comprising a pair of reversely parallel connected diodes coupled to the collector electrode of said second transistor and a capacitor means coupled from the diodes to the base electrode of said second transistor for initially providing a charging path for said capacitor means and thereafter providing that output signals above a predetermined value produce a degenerative feedback for limiting said output signals with said capacitor means of said second feedback means permitting operation of said second transistor over a wide range of collector to base potentials.

4. A transistor limiter amplifier comprising a first and a second transistor each having an emitter, a collector and a base electrode, said first transistor having its emitter electrode connected to the negative terminal of a source of biasing potential and having its collector electrode connected to the positive terminal of said source, a voltage divider connected between the positive terminal of said source and ground, said second transistor having its base electrode connected to the junction of said voltage divider, having its emitter electrode connected to ground, and having its collector electrode connected to the positive terminal of said source, diode means connecting the emitter electrode to the base electrode of said first transistor for preventing excessive reverse biasing across the emitter-base electrodes, resistance means for coupling a signal source to be amplified to the base electrode of said first transistor, means for deriving amplified signals from the collector electrode of said first transistor, first feedback means including a pair of reversely parallel connected diodes coupled to the collector electrode of said first transistor and a capacitor coupled from said diodes to the base electrode of said first transistor for initially providing a charging path for said capacitor and thereafter providing that amplified signals above a predetermined value produce a degenerative feedback for limiting said amplified signals, resistance means for coupling said amplified signals to the base electrode of said second transistor, means for deriving output signals from the collector electrode of said second transistor, and second feedback means including a pair of reversely parallel connected diodes coupled to the collector electrode of said second transistor and a capacitor coupled from the diodes to the base electrode of said second transistor for initially providing a charging path for said capacitor and thereafter providing that output signals above a predetermined value produce a degenerative feedback for limiting said output signals with the capacitors of said first and second feedback means operating to permit said transistors to operate over a wide range of collector to base potentials.

References Cited by the Examiner

UNITED STATES PATENTS

| | | | |
|---|---|---|---|
| 2,215,777 | 9/1940 | Benz | 330—110 X |
| 3,012,197 | 12/1961 | Peterson et al. | 330—110 X |
| 3,094,670 | 6/1963 | Batchelor | 330—110 X |

FOREIGN PATENTS

| | | |
|---|---|---|
| 50,263 | 10/1939 | France. |

OTHER REFERENCES

Army Technical Manual, TM 11–690: Basic Theory and Application of Transistors, March 1959.

ROY LAKE, *Primary Examiner.*

NATHAN KAUFMAN, *Examiner.*